United States Patent [19]

Eckert et al.

[11] Patent Number: 5,114,472
[45] Date of Patent: May 19, 1992

[54] MULTISTAGE RIGID MEDIA FILTER FOR MOLTEN METAL AND METHOD OF FILTERING

[75] Inventors: C. Edward Eckert, New Kensington; Thomas R. Hornack, Lower Burrell; George E. Lyness, Pittsburgh, all of Pa.; John A. Kaems; Clarence J. Cox, both of Maryville, Tenn.; Ronald E. Miller, Murrysville, Pa.; Diran Apelian, Worcester, Mass.; Rajakkannu Mutharasan, Broomall, Pa.

[73] Assignee: Aluminum Company of America, Pittsburgh, Pa.

[21] Appl. No.: 627,000

[22] Filed: Dec. 13, 1990

[51] Int. Cl.⁵ ................................. C22B 9/02
[52] U.S. Cl. ..................... 75/412; 266/227; 266/217; 164/134; 164/459; 75/678
[58] Field of Search ............... 266/227, 217; 75/412, 75/407, 678; 164/134, 459

[56] References Cited

U.S. PATENT DOCUMENTS

| | | |
|---|---|---|
| 2,840,463 | 6/1958 | Stroup et al. |
| 2,863,558 | 12/1958 | Brondyke et al. ............ 210/69 |
| 3,025,155 | 3/1962 | Lee et al. |
| 3,039,864 | 6/1962 | Hess et al. |
| 3,737,303 | 6/1973 | Blayden et al. |
| 3,737,304 | 6/1973 | Blayden et al. |
| 3,737,305 | 6/1973 | Blayden et al. |
| 4,154,689 | 5/1979 | Yarwood et al. ............ 75/412 |
| 4,384,888 | 5/1983 | Yu. |
| 4,769,158 | 9/1988 | Eckert ............ 210/780 |
| 4,872,908 | 10/1989 | Enright et al. ............ 75/412 |

*Primary Examiner*—Melvyn J. Andrews
*Attorney, Agent, or Firm*—Andrew Alexander

[57] ABSTRACT

A filter system for removing solid impurities from molten metal is described comprising a housing containing vertically disposed rigid coarse filter facing the incoming flow of molten metal and capable of removing solids having a particle size of at least 10 microns and a rigid fine filter mounted vertically behind the coarse filter and capable of removing solids having a particle size as small as 1 micron. The apparatus further includes a heater for maintaining the temperature of the molten metal and a sparger mounted adjacent the front face of one filter to provide an intermittent gas flow over the face of the filter to dislodge solids on the filter as filter cake. In a preferred embodiment, the rigid filters are nested cylinders, and the molten metal is directed to the center of the smaller coarse filter cylinder from which it then flows through the coarse filter outward to and through the fine filter cylinder and then from the fine filter out of the filter housing.

61 Claims, 3 Drawing Sheets

MULTISTAGE RIGID MEDIA FILTER FOR MOLTEN METAL AND METHOD OF FILTERING

BACKGROUND OF THE INVENTION

1. Field of the Invention

This invention relates to the purification of a molten metal by filtration. More particularly, this invention relates to a two-stage filtration system, including method and apparatus for the purification of molten metal using coarse and fine rigid filter media.

2. Description of the Related Art

The removal of impurities from a molten metal such as aluminum has been previously accomplished by passing a chlorine-containing gas through the molten aluminum, by passing the molten aluminum through filtration means, or using a combination of same.

For example, Stroup et al U.S. Pat. No. 2,840,463 teaches the purification of aluminum by dripping the aluminum through a perforated plate into a gas-tight vessel filled with aluminum chloride gas which is used to degas and purify the aluminum metal as it drips into the vessel.

Molten metal has also been purified by passing it through a bed of particles or granules which provides filtration without caking or clogging of the filter. For example, Brondyke et al U.S. Pat. No. 2,863,558 describes the purification of molten aluminum to remove finely divided non-metallic particles or inclusions by passing the aluminum metal through a bed of refractory particles.

The use of more than one size of refractory particles in the filtration bed is shown in Lee et al U.S. Pat. No. 3,025,155, Hess et al U.S. Pat. No. 3,039,864 and Blayden U.S. Pat. Nos. 3,737,303 and 3,737,305. In these patents, a gas is bubbled countercurrently through the bed which may comprise a chlorine-containing gas capable of reacting with the impurities in the molten aluminum, or a non-reactive gas, which may be used to remove occluded gases from the molten aluminum as well as to provide a backflushing of the particle bed.

Blayden et al U.S. Pat. No. 3,737,304 describes an apparatus and method for purifying aluminum by passing it through two such beds of refractory granules while both chlorine and non-reactive gases are passed countercurrently. The second filter bed differs from the first bed in that only coarse refractory granules are present in the first bed, while a bed of smaller sized refractory granules is located over a bed of coarse granules in the second bed.

Yu U.S. Pat. No. 4,384,888 shows a method of purifying molten aluminum by passing it through a medium of submerged contacting surfaces, such as found on Raschig rings or Interloc saddles, while passing a gas flux through the metal. The patentee prefers such contact surface media over the use of particles because of the larger void fraction obtainable by such usage. Periodically, gas is passed through the bed at two or three times the normal rate to purge or dislodge materials trapped in the bed to cause such materials to rise and collect as a floating layer. A single layer of ¾ inch to 1 inch refractory balls on the molten metal surface are said to restrain the rings and saddles from leaving the bed during the high rate purging gas flow.

Non-particulate filter means have also been used in the filtration of molten aluminum. Eckert U.S. Pat. No. 4,769,158 describes a method and system for filtering a molten metal using a movable and flexible filter cloth which separates a first chamber from a second chamber in a filtering apparatus. The filter cloth may be gradually unrolled from a roll outside the first chamber to provide new filtration surfaces as particles collect on (and eventually clog) the filter cloth. Secondary filtration comprising a static filter is provided in the second chamber to trap any inclusions which dislodge from the filter cloth.

It would, however, be desirable to have rigid filter means capable of removing both coarse and fine impurities from a molten metal while inhibiting the usual clogging of a rigid filter and wherein the rigid filter means may be easily removed for replacement.

SUMMARY OF THE INVENTION

It is, therefore, an object of the invention to provide multiple stage rigid filter means for filtering a molten metal to remove impurities.

It is another object of the invention to provide rigid filter means for filtering a molten metal to remove impurities comprising a coarse filter means and a fine filter means to avoid rapid filter plugging.

It is yet another object of the invention to provide multiple stage rigid filter means for filtering a molten metal to remove impurities which includes means for purging the rigid filter means of accumulated filter cake.

It is still another object of the invention to provide multiple stage rigid filter means for filtering a molten metal to remove impurities which includes means for percolating a purging gas tangentially across the face of the rigid filter means to purge the filter means of accumulated filter cake.

It is a further object of this invention to provide multiple stage rigid filter means for filtering a molten metal to remove impurities which includes coarse and fine rigid cartridge filters which may be easily installed and removed.

It is yet a further object of the invention to provide a method for filtering a molten metal to remove impurities which comprises the steps of passing the molten metal through rigid coarse filter means, passing the molten metal through rigid fine filter means, and passing a purging gas tangentially across the face of at least one of the rigid filter means to purge the filter means of accumulated filter cake.

These and other objects of the invention will be apparent from the following description and accompanying drawings.

DETAILED DESCRIPTION OF THE INVENTION

Figure 2:
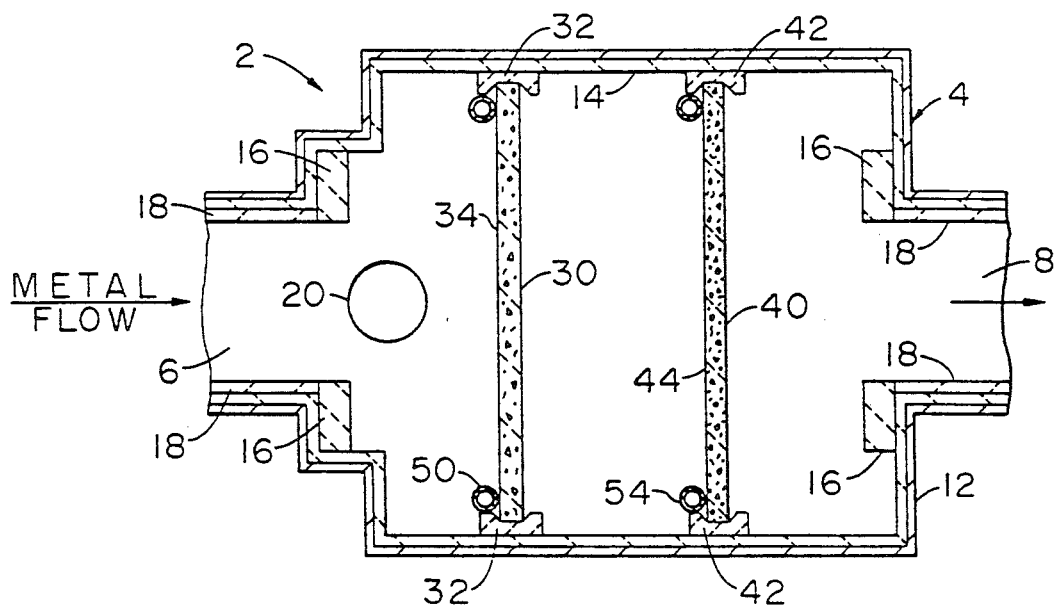
FIG. 2 is a top view of the simplest form of the filter system of the invention.

Turning now to FIG. 2, the filter system of the invention is illustrated, in its simplest form at 2, comprising a housing 4 containing vertically disposed rigid coarse filter means 30 facing the incoming flow of molten metal and capable of removing solids having a particle size of 10 microns or greater; and rigid fine filter means 40 mounted vertically behind coarse filter 30 and capable of removing solids having a particle size less than 10 microns, e.g., as small as 1 micron. While the filter apparatus of the invention may be used in connection with the purification of a number of molten metals, it may find particular utility in the purification of molten aluminum and aluminum base alloys, e.g., an alloy containing at least 50 wt.% aluminum. By use of aluminum as used herein is meant to include aluminum and its alloys.

Housing 4, which is provided with an inlet port 6 and an outlet port 8, may comprise a metal outer shell 12, and an inner layer of refractory material 14 capable of withstanding the temperature and resistance to corrosion by the molten metal. Examples of refractory materials capable of withstanding temperatures as high as, for example, 850° C. include silicon carbide, silicon nitride, alumina, mulite, silica, chromite, forsterite, magnesia, spinel, periclase and zirconia. Preferably, the refractory material used in forming lining or layer 14 comprises a phosphate bonded high alumina material. Additional thicknesses of the same or different refractory lining materials 16 and 18 may be provided adjacent inlet port 6 and outlet port 8 to provide additional protection from erosion by the molten metal as it flows into and out of filter system 2.

Figure 1:
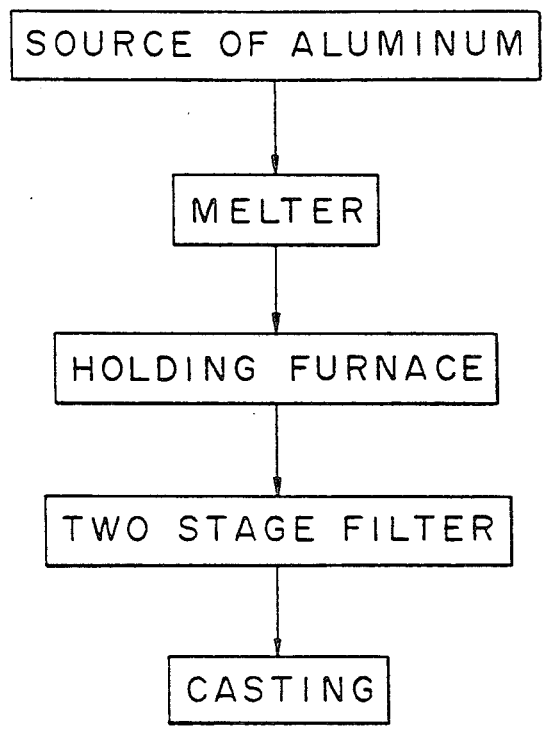
FIG. 1 is a flowsheet illustrating the sequence of events prior to and following the filtering of a molten metal.

Positioned just inside housing 4, adjacent inlet port 6, is a heater 20 to ensure that the molten metal reaching coarse filter 30 will be in molten form, e.g., from about 675° C. to about 815° C. for an aluminum base alloy. Although it will be noted from the flowsheet of FIG. 1 that the metal passes through a melter and then a holding furnace prior to entry into filter 2, it is important to maintain the temperature of the metal being filtered above its melting point as it travels to coarse filter 30. Heater 20 may comprise either a gas or, preferably, an electric powered heater. The outer surface of heater 20 should be constructed of a material capable of withstanding the temperature of the molten metal, e.g., at least about 675° C. in the case of an aluminum base alloy, and must comprise a material which will not be chemically attacked by the molten metal nor contaminate the molten metal. Any of the materials previously listed as furnace lining materials may be used on the surface of heater 20 to protect it from the molten metal.

Coarse filter 30 is mounted within housing 4 on filter mounting channels 32 which may be provided on the sidewalls and the bottom of housing 4 to prevent any metal from flowing from inlet port 6 to outlet port 8 other than through filter 30. Filter 30 may comprise a sintered or chemically bonded mass of particles having a particle size range of from about 2 to about 18 mesh, preferably 4 to 10 mesh (U.S. Sieve Series).

The particular materials used in forming coarse filter 30 must meet the previously discussed criteria of being able to withstand the operating temperature and being chemically resistant to attack by the molten metal which could otherwise both damage the filter and contaminate the metal. The thickness of filter 30 may range from about 10 to about 250 millimeters. Any of the materials previously listed as suitable refractory materials may be used in particulate form to construct filter to form the desired rigid filter media using, for example, a borosilicate glass material.

Preferably, the filter is constructed from alumina or silicon carbide particles. For example, the alumina filter may be a phosphate bonded alumina or borosilicate bonded alumina. Such filters are available from Metaullics Systems, Solon, Ohio.

Fine filter 40 is similarly mounted within housing 4 on filter mounting channels 42 which also may be provided on the sidewalls and the bottom of housing 4 to prevent any metal from flowing other than through filter 40 after it passes through coarse filter 30. Filter 40 may comprise a sintered or chemically bonded mass formed from particles having a particle size range of from about 8 to about 36 mesh, preferably 8 to 28 mesh (U.S. Sieve Series).

The same materials used in forming coarse filter 30 may also be used in forming filter 40. Filter 40 may range in thickness from about 10 to about 250 millimeters.

In the present filtering system, there can be two modes of capture for particles contained in the molten metal. That is, in the first mode, particles to be captured can penetrate into the rigid filter (sometimes referred to as depth filtration). In the second mode, particles to be captured build up on the surface of the filter and form a filter cake which aids the capture efficiency of the coarse filter. Capture rate is proportional to the throughput rate of molten metal passing through the filter. It is this filter cake which can be efficiently removed by percolating gas across the filter surface thereby regenerating the filter.

The filtering system of the present invention is a substantially constant flow rate filter system wherein the filtration pressure changes or increases as filter cake builds. The increase in pressure permits the flow rate through the filter to remain more or less constant even though the molten metal is encountering more resistance by virtue of the cake build-up. Constant flow rate is an important feature because a constant supply of molten metal is required to supply a continuous casting facility. Thus, while the flow rate downstream of the filters remains substantially constant, upstream a molten metal head builds up in response to increased flow resistance by virtue of the build-up of filter cake.

In the embodiment shown in FIG. 2, an optional lid (not shown) may be placed over the top of filter apparatus 2 both to conserve heat as well as to permit the molten metal surface to be blanketed with an inert or reducing gas to inhibit oxidation of the molten metal at the surface.

Positioned on the bottom and side end edges of filter 30 on side surface 34 of filter 30 facing inlet port 6 is a sparger ring 50 having openings thereon to permit a gas to be discharged therefrom and to contact the filter or filter cake to facilitate its removal. The gas openings in ring 50 are positioned to direct a flow of gas from sparger ring 50 tangentially along face 34 of filter 30 facing the incoming molten metal. This flow of gas will serve to dislodge solid particles or inclusions from face 34 of filter 30 which have been captured on the filter. Removal of the captured particles by sparging gas or percolation of gas over the filter may be conventionally accomplished when metal is not flowing through the filter. The dislodged particles will then float to the surface where they may be removed by skimming the molten metal surface with appropriate means for removing such impurities.

Volume flow rate of the gas over the surface of the filter should range from about 5 SCFH to about 225 SCFH to ensure a sufficient bubble population passing by face 34 to cause dislodgement of the impurities thereon. The gas used may be an inert or nonreactive gas such as neon or argon.

Turning now to FIGS. 3-6, a preferred embodiment of the filter apparatus of the invention is generally indicated at 102 generally comprising a coarse cylindrical filter 130 and a fine cylindrical filter 140 of different diameter. The two cylindrical filters are concentrically mounted around cylindrical heater 120 in a housing 104 comprising a metallic shell 112 and a refractory liner 114 which may be constructed of the same refractory materials as used for previously described liner 14.

Figure 3:
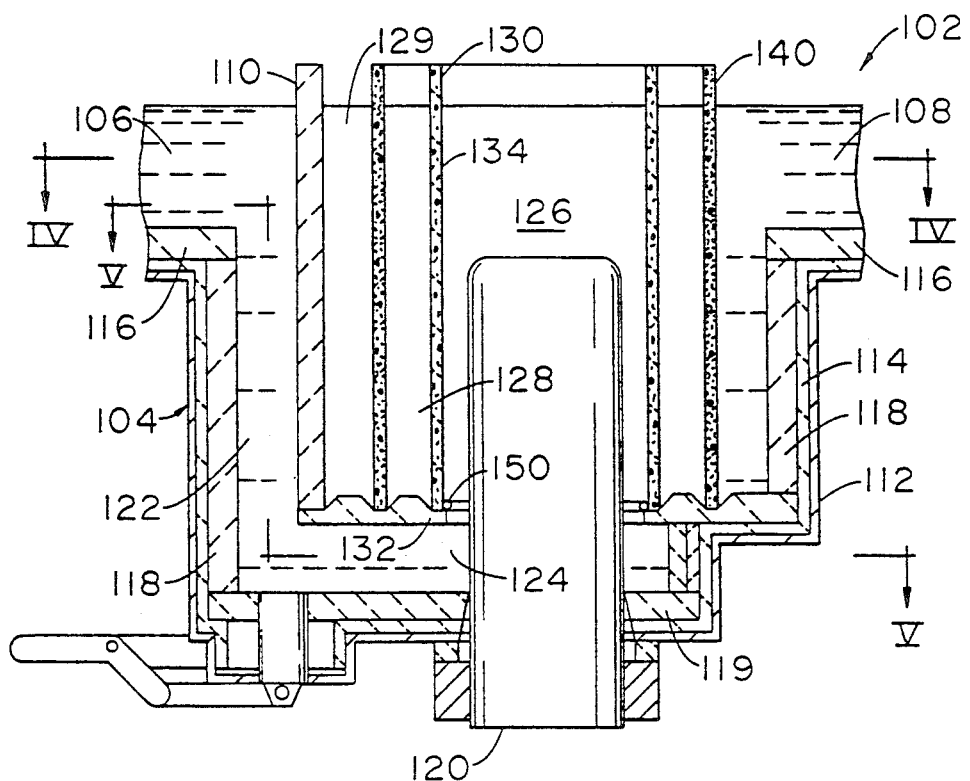
FIG. 3 is a side section view of the preferred embodiment of the filter system of the invention.
Figure 4:
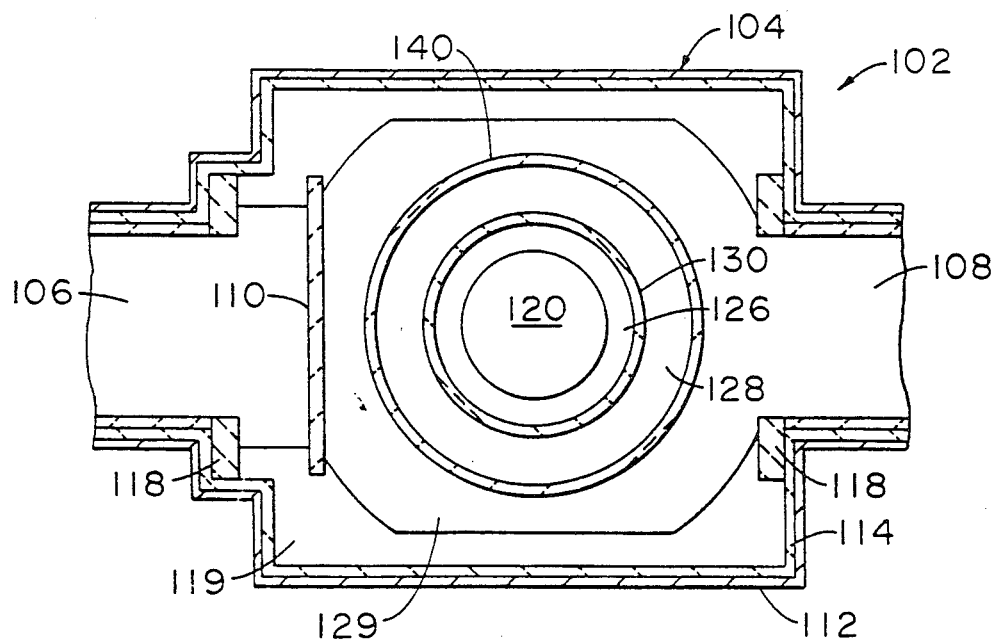
FIG. 4 is a top section view of the filter system of FIG. 3 taken along lines IV—IV.
Figure 5:
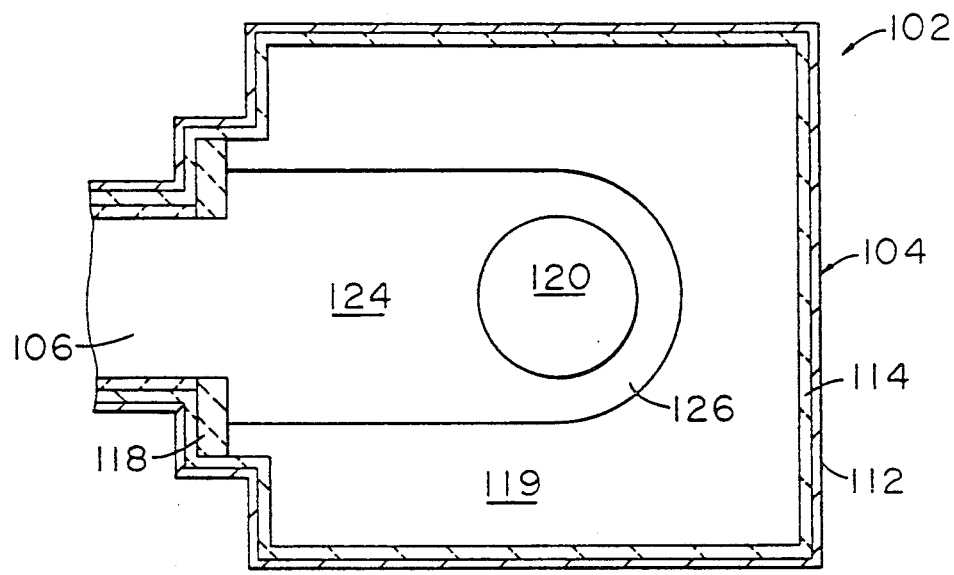
FIG. 5 is a top section view of the filter system of FIG. 3 taken along lines V—V.

Filter apparatus 102 is provided with a molten metal inlet port 106 and an outlet port 108. However, as best seen in FIGS. 3, 4 and 5, the molten metal entering filter 102 through inlet port 106 first passes down a vertical passageway 122 defined by refractory liner 118 and vertical block 110 of refractory material which separates passageway 122 from outer concentric chamber 129 and the outer surface of fine filter 140, as will be explained below. The molten metal then flows through a horizontal passageway 124 in refractory bottom wall 119 beneath horizontal filter support 132 and vertical block 110 to emerge in a central chamber 126 externally surrounded by the inner face 134 of cylindrical coarse filter 130 and in which is centrally mounted circular heater 120. Heater 120 and cylindrical filter 130 are coaxially mounted in filter housing 104 so that heater 120 is generally equally spaced from inner filter face 134 and of smaller diameter than filter 130 to permit the molten metal to flow therebetween.

As in the previous embodiment, an optional cover may be fitted over the filtration apparatus for the reason previously discussed.

The molten metal thus flows through inlet port 106 into passageways 122 and 124 and thence into central chamber 126 to then pass through cylindrical coarse filter 130 into an inner concentric chamber 128 defined by the circular space between coarse cylindrical filter 130 and fine cylindrical filter 140. Fine cylindrical filter 140 is of larger diameter than cylindrical filter 130 and coaxially mounted in filter apparatus 102 to surround coarse filter 130. The molten metal then passes through fine filter 140 to emerge in an outer concentric chamber 129 which is in communication with exit port 108, as best seen in FIG. 4.

Figure 6:
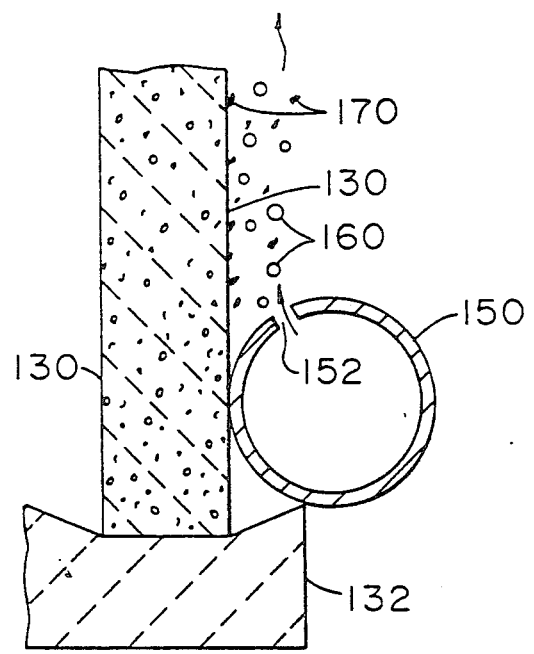
FIG. 6 is an enlarged fragmentary side section view of a portion of the filter system of FIG. 3 showing the tangential gas flow used to purge accumulated solids from the face of the filter means.

In this embodiment, a circular ring of slightly smaller diameter than the inner diameter of cylindrical fine filter 130 is positioned adjacent the bottom edge of inner filter face 134, as best seen in FIG. 6. The ring percolates gas therefrom onto the surface of the filter to dislodge filter cake therefrom.

As in the previously described embodiment, the release of gas through openings 152 in sparger ring 150 is directed by the positioning of openings 152 to result in a tangential flow of gas bubbles 160 along surface 134 of filter 130 to dislodge solid particles 170 which have accumulated on filter surface 134 to thereby inhibit clogging and control flow through filter 130. A third filter (not shown) may be placed just before exit 108 to capture any particle of filter media which may get detached from the filters. Such filter may be comprised of coarse reticulated foam ceramic material.

In either of the illustrated embodiments, either the coarse filter or the fine filter may be easily replaced by merely engaging the top portion of the vertically positioned filter, which protrudes out of the molten metal, and vertically lifting the rigid filter out of filter housing through the open top (after removal of the optional top or lid, if present). A replacement filter may then be lowered into the molten metal in filter housing.

In the process of the invention, the molten aluminum may be subjected to a fluxing operation to remove hydrogen and undesirable trace elements and inclusions using fluxing gases such as non-reactive gases, including the so-called inert gases such as argon. Chlorine gas may be incorporated up to about 30% with the fluxing gas. Fluxing may take place just prior to the first filtering mode or between the first and second filters.

It should be noted that while the use of two filters has been illustrated, i.e., a coarse filter and a fine filter, more than two filters may be employed if desired. For example, provision could be made for mounting a second coarse filter adjacent the first coarse filter and a second fine filter adjacent the first fine filter. Then, when it is desired to remove and replace either the fine or coarse filter, a second coarse or fine filter could be mounted in the filter apparatus prior to removal of the filter to be replaced, thus permitting uninterrupted filtering during the replacement of a filter.

The subject filtering process has the advantage that it requires a much smaller volume of molten metal for the filtering process. That is, conventional processes can require filter boxes having a 17000 pound molten metal capacity to provide sufficient capacity for a caster. By comparison, the subject invention requires only about 1000 pounds capacity to provide the required capacity for the caster.

A further advantage resides in the fact that the subject filters can be rejuvenated by percolating of gas over the filter surface to scour filler cake therefrom. By comparison, the 17000 pound capacity type which utilizes a standard bed of loosely packed material cannot be rejuvenated. That is, when the bed plugs, it must be removed.

While the filtering system has been shown with the molten metal entering the center of the coarse filter and moving outwardly towards the finer filter in a radial direction, it will be appreciated that the coarse filter may be the outer filter and the finer filter the inner filter with the metal flow reversed. Or, the filters may be placed above each other with the coarse filter on top with the molten metal flowing in a downwardly direction. The molten metal flow direction may be down an incline with the filters placed appropriately to take advantage of the pressure gain.

To demonstrate the operation of the molten metal filter apparatus of the invention, a 25 mm thick coarse cylindrical filter, having an average grain size of 6 mesh, an outer diameter of 36 cm, and a height of 75 cm was placed into a filter housing similar to the embodiment shown in FIGS. 3-6. An outer fine cylindrical filter, having a grain size of about 10 mesh, a thickness of about 25 mm, an inner diameter of 60 cm, and a height of about 75 cm was concentrically mounted around the coarse inner filter housing.

A molten aluminum base alloy was introduced into the filter housing and maintained at a temperature range of about 30° C. by the centrally mounted electric heater.

The flow of the aluminum base alloy through the filter apparatus was at a rate of about 80,000 lbs/hr. Purging gas was directed across the inner face of the coarse filter cylinder at a rate of 30 CFH for 5 minutes after approximately 600,000 pounds of metal passed through the filter.

600,000 pounds of an aluminum base alloy was passed through the filter apparatus over a period of 18 hours before noticeable clogging was observed.

Thus, the invention provides a multistage rigid filter system comprising a rigid coarse filter and a rigid fine filter which may both be vertically disposed in a filter housing to permit easy removal and replacement of either filter. Purging gas means located adjacent at least one edge of the inner surface of the filter surface facing the incoming flow of molten metal intermittently may be percolated over the face of the coarse filter. In a preferred embodiment, the filters comprise concentrically mounted cylindrical filters to maximize the strength and surface area of the filter media.

What is claimed is:

1. A method of treating molten aluminum containing particles therein to remove particles from the molten aluminum comprising:
   (a) passing said molten aluminum through a first rigid filter media having a first surface to remove a fraction of the particles from said molten aluminum;
   (b) collecting particles on said first surface as filter cake, particles in the filter cake capable of being removed from said surface by contacting the filter cake with gas bubbles; and
   (c) passing said molten aluminum from step (a) through a second rigid filter media to remove particles therefrom having a size generally smaller than the particles removed in step (a).

2. The method in accordance with claim 1 wherein said first filter is a porous ceramic filter formed from bonded ceramic particles having a size in the range of 2 to 18 mesh.

3. The method in accordance with claim 1 wherein said second filter is a porous ceramic filter formed from bonded ceramic particles having a size in the range of 8 to 36 mesh.

4. The method in accordance with claim 1 wherein said first and second filters are porous ceramic filters comprised of a material selected from silicon carbide, silicon nitride and alumina.

5. The method in accordance with claim 1 wherein the molten aluminum has a temperature in the range of 675° to 815° C.

6. The method in accordance with claim 1 wherein the first filter defines a first filter box into which molten aluminum is added for filtering and the second filter defines a second filter box surrounding the first filter box and which receives partially filtered aluminum.

7. The method in accordance with claim 6 wherein the first filter box has walls fabricated from the rigid filter media which are substantially vertical and the molten metal is filtered therethrough in a generally outward direction.

8. The method in accordance with claim 6 wherein the second filter box has walls fabricated from the rigid filter media which are substantially vertical and through which the molten metal is filtered in a generally outward direction.

9. The method in accordance with claim 6 wherein the first filter box is generally circular.

10. The method in accordance with claim 6 wherein the second filter box is generally circular.

11. The method in accordance with claim 1 wherein the first filter contains a pool of molten metal for filtering a fraction of larger particles therefrom and the second filter contains the filtered metal from the first filter from which smaller particles are to be removed.

12. A method of treating molten aluminum containing particles therein to remove particles from said molten aluminum comprising:
   (a) passing said molten aluminum through a first rigid filter media having a first surface to remove particles from said molten aluminum, the particles having a size of 10 microns or greater, the filter formed from ceramic particles laving a size in the range of 2 to 12 mesh;
   (b) collecting said particles on said first surface as filter cake;
   (c) removing filter cake from said first surface by contacting said first surface with gas bubbles; and
   (d) passing said molten aluminum from step (a) through a second rigid filter media to remove particles therefrom having a size generally smaller than the particles removed in step (a), the particles being removed having a size less than 10 microns, the filter formed from ceramic particles having a size in the range of 8 to 36 mesh, the first and second filters being porous ceramic filters comprised of a material selected from silicon carbide, silicon nitride and alumina.

13. The method in accordance with claim 12 wherein the first filter defines a first filter box into which molten aluminum is added for filtering and the second filter defines a second filter box surrounding the first filter box and which receives partially filtered aluminum.

14. The method in accordance with claim 13 wherein the first filter box has walls fabricated from the rigid filter media which are substantially vertical and the molten metal is filtered therethrough in a generally outward direction.

15. The method in accordance with claim 13 wherein the second filter box has walls fabricated from the rigid filter media which are substantially vertical and through which the molten metal is filtered in a generally outward direction.

16. The method in accordance with claim 13 wherein the first filter box is generally circular.

17. The method in accordance with claim 13 wherein the second filter box is generally circular.

18. A method of treating molten aluminum containing particles therein to remove particles from said molten aluminum comprising:
   (a) passing said molten aluminum through a first rigid filter media having a first surface to remove the particles from said molten aluminum and to collect filter cake on said first surface, the particle having a size of about 10 microns or greater, the first rigid filter media defining a filter box into which molten aluminum is added for filtering;
   (b) removing filter cake from said first surface by contacting the filter cake with gas bubbles; and
   (c) passing said molten aluminum from step (a) through a second rigid filter media to remove particles therefrom having a size generally smaller than the particles removed in step (a), the particles being removed having a size of less than 10 microns, the second rigid filter media defining a second filter box surrounding the first filter box.

19. The method in accordance with claim 18 wherein the first rigid filter box has a generally cylindrical configuration.

20. The method in accordance with claim 18 wherein the second rigid filter box has a generally cylindrical configuration.

21. A method of treating molten aluminum containing particles thereon to remove particles from said molten aluminum comprising:
   (a) passing said molten aluminum through a first rigid filter media having a first surface to remove the particles from said molten aluminum and to collect filter cake on said first surface, the particle having a size of 10 microns or greater, the first rigid filter having a generally cylindrical configuration into which molten aluminum is added for filtering;
   (b) removing filter cake from said first surface by contacting the filter cake with gas bubbles; and
   (c) passing said molten aluminum from step (a) through a second rigid filter media to remove particles therefrom having a size generally smaller than the particles removed in step (a), the particles being removed having a size of less than 10 microns, the second rigid filter having a generally cylindrical configuration and surrounding the first rigid filter.

22. In an improved process for casting aluminum wherein molten aluminum is transferred from a melting unit to a casting unit, the improvement comprising subjecting the molten aluminum to a filtering process prior to casting to remove particles contained in the aluminum by:
   (a) passing said molten aluminum through a first rigid filter media having a first surface to remove a fraction of the particles from said molten aluminum;
   (b) collecting said particles on said first surface as filter cake, the particles capable of being removed from said surface by contacting the filter cake with gas bubbles; and
   (c) passing said molten aluminum from step (a) through a second rigid filter media to remove particles therefrom having a size generally smaller than the particles removed in step (a).

23. The method in accordance with claim 22 wherein said first filter is a porous ceramic filter formed from ceramic particles having a size in the range of 2 to 12 mesh.

24. The method in accordance with claim 22 wherein said second filter is a porous ceramic filter formed from ceramic particles having a size in the range of 8 to 36 mesh.

25. The method in accordance with claim 22 wherein said first and second filters are porous ceramic filters comprised of a material selected from silicon carbide, silicon nitride and alumina.

26. The method in accordance with claim 22 wherein the molten aluminum has a temperature in the range of 675° to 815° C.

27. The method in accordance with claim 22 wherein the first filter defines a first filter box into which molten aluminum is added for filtering and the second filter defines a second filter box surrounding the first filter box and which receives partially filtered aluminum.

28. The method in accordance with claim 27 wherein the first filter box has walls fabricated from the rigid filter media which are substantially vertical and the molten metal is filtered therethrough in a generally outward direction.

29. The method in accordance with claim 27 wherein the second filter box has walls fabricated from the rigid filter media which are substantially vertical and through which the molten metal is filtered in a generally outward direction.

30. The method in accordance with claim 27 wherein the first filter box is generally circular.

31. The method in accordance with claim 27 wherein the second filter box is generally circular.

32. The method in accordance with claim 28 wherein the first filter circumscribes and contains a pool of molten metal for filtering the larger particles therefrom and the second filter circumscribes and contains the filtered metal from which the smaller particles are to be removed.

33. In an improved process for casting aluminum wherein molten aluminum is transferred from a melting unit to a casting unit, the improvement comprising subjecting the molten aluminum to a filtering process prior to casting to remove particles contained in the aluminum by:
   (a) passing said molten aluminum into a first porous ceramic filter box having a generally cylindrical wall;
   (b) flowing said aluminum outwardly through said wall to remove a fraction of the particles from said molten aluminum, collecting said particles on said wall of said first filter box as filter cake, the particles capable of being removed from said surface by contacting the filter cake with gas bubbles, said aluminum being passed into a second filter box having a generally cylindrical wall comprised of a porous ceramic which surrounds said first filter box; and
   (c) passing said molten aluminum through the porous ceramic wall of the second filter box to remove particles therefrom having a size generally smaller than the particles removed in step (b).

34. In an improved process for casting aluminum wherein molten aluminum is transferred from a melting unit to a casting unit, the improvement comprising subjecting the molten aluminum to a filtering process prior to casting to remove particles contained in the aluminum by:
   (a) passing said molten aluminum through a first rigid filter media having a first surface to remove the particles from said molten aluminum, the particles having a size of 10 microns or greater;
   (b) collecting said particles on said first surface as filter cake;
   (c) removing filter cake from said first surface by contacting said filter cake with gas bubbles; and
   (d) passing said molten aluminum from step (a) through a second rigid filter media to remove particles therefrom having a size generally smaller than the particles removed in step (a), the particles being removed having a size less than 10 microns, the filter formed from ceramic particles having a size in the range of 2 to 18 mesh, the first and second filters being porous ceramic filters comprised of a material selected from silicon carbide, silicon nitride and alumina.

35. The method in accordance with claim 34 wherein said first filter is a porous ceramic filter formed from ceramic particles having a size in the range of 4 to 10 mesh.

36. The method in accordance with claim 34 wherein said second filter is a porous ceramic filter formed from ceramic particles having a size of 9 to 36 mesh.

37. The method in accordance with claim 34 wherein said first and second filters are porous ceramic filters comprised of a material selected from silicon carbide, silicon nitride and alumina.

38. The method in accordance with claim 34 wherein the molten aluminum has a temperature in the range of 675° to 815° C.

39. The method in accordance with claim 34 wherein the first filter defines a first filter box into which molten aluminum is added for filtering and the second filter defines a second filter box surrounding the first filter box and which receives partially filtered aluminum.

40. The method in accordance with claim 39 wherein the first filter box has walls fabricated from the rigid filter media which are substantially vertical and the molten metal is filtered therethrough in a generally outward direction.

41. The method in accordance with claim 39 wherein the second filter box has walls fabricated from the rigid filter media which are substantially vertical and through which the molten metal is filtered in a generally outward direction.

42. The method in accordance with claim 39 wherein the first filter box is generally circular.

43. The method in accordance with claim 39 wherein the second filter box is generally circular.

44. The method in accordance with claim 34 wherein the first filter circumscribes and contains a pool of molten metal for filtering the larger particles therefrom and the second filter circumscribes and contains the filtered metal from which the smaller particles are to be removed.

45. In an improved process for casting aluminum wherein molten aluminum is transferred from a melting unit to a casting unit, the improvement comprising subjecting the molten aluminum to a filtering process prior to casting to remove particles contained in the aluminum by:
(a) passing said molten aluminum into a first filter box having a generally cylindrical porous wall, the filter box wall comprised of ceramic powder having a size in the range of about 2 to 12 mesh, the powder bonded together to form said filter box wall;
(b) flowing said aluminum outwardly through said wall to remove a fraction of the particles from said molten aluminum, collecting said particles on said wall of said first filter box as filter cake, said aluminum being flowed into a second filter box having a generally cylindrical wall comprised of a porous ceramic which surrounds said first filter box;
(c) removing filter cake from said wall of said first filter box by contacting said filter cake with gas bubbles; and
(d) passing said molten aluminum from step (a) through the porous ceramic wall of the second filter box to remove particles therefrom having a size generally smaller than the particles removed in step (a), the particles being removed having a size less than about 10 microns, the porous ceramic wall comprised of ceramic powder having a size in the range of about 8 to 36 mesh.

46. The process in accordance with claim 1 wherein the first filter box has walls which are substantially vertical and molten aluminum is added in lower regions thereof.

47. The process in accordance with claim 1 wherein the second filter box has substantially vertical walls.

48. In an improved process for casting aluminum wherein molten aluminum is transferred from a melting unit to a casting unit, the improvement comprising subjecting the molten aluminum to a filtering process prior to casting to remove particles contained in the aluminum by:
(a) passing said molten aluminum through a rigid filter media having a first surface to remove a fraction of the particles from said molten aluminum;
(b) collecting said particles on said first surface as filter cake; and
(c) removing particles from said surface by contacting the filter cake with gas bubbles.

49. In an improved process for casting aluminum wherein molten aluminum is transferred from a melting unit to a casting unit, the improvement comprising subjecting the molten aluminum to a filtering process prior to casting to remove particles contained in the aluminum by:
(a) passing said molten aluminum into a porous ceramic filter box having a generally cylindrical wall;
(b) flowing said aluminum outwardly through said wall to remove a fraction of the particles from said molten aluminum, collecting said particles on said wall of said first filter box as filter cake, the particles capable of being removed from said surface by contacting the filter cake with gas bubbles, said aluminum being passed into a second filter box having a generally cylindrical wall comprised of a porous ceramic which surrounds said filter box; and
(c) removing filter cake from said wall by contacting the filter cake with gas bubbles.

50. In an improved process for casting aluminum wherein molten aluminum is transferred from a melting unit to a casting unit, the improvement comprising subjecting the molten aluminum to a filtering process prior to casting to remove particles contained in the aluminum by:
(a) passing said molten aluminum through a rigid filter media having a first surface to remove the particles from said molten aluminum, the particles having a size of 10 microns or greater;
(b) collecting said particles on said first surface as filter cake; and
(c) removing filter cake from said first surface by contacting said filter cake with gas bubbles.

51. In an improved process for casting aluminum wherein molten aluminum is transferred from a melting unit to a casting unit, the improvement comprising subjecting the molten aluminum to a filtering process prior to casting to remove particles contained in the aluminum by:
(a) passing said molten aluminum into a filter box having a generally cylindrical porous wall, the filter box wall comprised of ceramic powder having a size in the range of about 2 to 12 mesh, the powder bonded together to form said filter box wall;
(b) flowing said aluminum outwardly through said wall to remove a fraction of the particles from said molten aluminum, collecting said particles on said wall of said filter box as filter cake; and (c) removing filter cake from said wall of said first filter box by contacting said filter cake with gas bubbles.

52. Apparatus for filtering a molten aluminum to remove solids therefrom which comprises:
   (a) a filter housing having an inlet port and an outlet port;
   (b) rigid coarse filter means within said housing capable of removing solids from the molten aluminum by collecting said solids as filter cake on a front face, the course of said filter means having a particle size of at least 10 microns;
   (c) means for directing a flow of gas towards a front face of the coarse rigid filter means to dislodge filter cake therefrom;
   (d) rigid fine filter means within said housing capable of removing solids from the molten aluminum by collecting said solids as filter cake on a front face of said fine filter means, the solids having a particle size of at least 1 micron;
   (e) means for directing a flow of gas towards a front face of the fine rigid filter means to dislodge filter cake therefrom.

53. The apparatus of claim 52 wherein said rigid coarse filter means comprises a porous filter having an average grain size of about 2 to 18 mesh.

54. The apparatus of claim 52 wherein said rigid fine filter means comprises a porous filter having an average grain size of about 6 to 28 mesh.

55. The apparatus of claim 52 wherein said coarse and fine filter means are mounted vertically in said filter housing.

56. The apparatus of claim 52 wherein said apparatus further comprises heating means for maintaining said metal at a temperature above its melting point.

57. The apparatus of claim 52 wherein said means for directing a flow of gas across the face of said filter comprises sparger means having openings therein facing said front face of said one or more filters.

58. The apparatus of claim 52 wherein said rigid coarse filter means and said rigid fine filter means are cylindrical and said rigid coarse filter means has a diameter smaller than said rigid fine filter means, said coarse filter means is mounted in said filter housing within said fine filter means, and passage means in said housing are provided to direct the flow of molten metal from said inlet port to an inner surface of said coarse filter means.

59. The apparatus of claim 58 which further includes passageway means to direct the flow of molten metal from an outer face of said cylindrical rigid fine filter means to said outlet port.

60. The apparatus of claim 59 wherein a heater means is positioned within said cylindrical rigid coarse filter means to heat said molten metal before it passes through said coarse filter means.

61. Apparatus for filtering a molten metal to remove solids therefrom which comprises:
   (a) a filter housing having an inlet port and an outlet port;
   (b) heating means located generally central in said housing;
   (c) rigid coarse cylindrical filter means vertically positioned within said housing surrounding said heater means, said coarse filter means comprising a ceramic material having an average grain size of about 2 mesh and capable of removing solids having a particle size of at least 10 microns;
   (d) passage means in said housing to direct the incoming flow of said molten metal from said inlet port to a space within said coarse cylindrical filter means;
   (e) rigid fine cylindrical filter means vertically positioned within said housing having a larger diameter than said cylindrical coarse filter means and mounted in said housing surrounding said coarse filter means, said fine filter means comprising a ceramic material having an average grain size of about 5 and capable of removing solids having a particle size of at least 10 microns; and
   (f) means for directing a flow of gas toward a front face of said coarse rigid filter means to dislodge filter cake therefrom.

* * * * *

UNITED STATES PATENT AND TRADEMARK OFFICE
CERTIFICATE OF CORRECTION

PATENT NO. : 5,114,472
DATED : May 19, 1992
INVENTOR(S) : C. Edward Eckert et al It is certified that error appears in the above-identified patent and that said Letters Patent is hereby corrected as shown below:

| | |
|---|---|
| Col. 4, line 3 | After "filter", insert --30. The particles may be chemically bonded or sintered together-- |
| Col. 8, line 15, Claim 12 | Change "laving" to --having-- |
| Col. 14, line 36, Claim 61 | After "about", change "5" to --6-- |

Signed and Sealed this

Twenty-fourth Day of August, 1993

Attest:

BRUCE LEHMAN

Attesting Officer     Commissioner of Patents and Trademarks